(12) United States Patent
Willis

(10) Patent No.: US 9,299,284 B2
(45) Date of Patent: Mar. 29, 2016

(54) SYSTEM AND METHOD FOR DARK NOISE REDUCTION IN PULSE WIDTH MODULATED (PWM) DISPLAYS

(75) Inventor: Donald Henry Willis, Indianapolis, IN (US)

(73) Assignee: THOMSON LICENSING, Boulogne-Billancourt (FR)

( * ) Notice: Subject to any disclaimer, the term of this patent is extended or adjusted under 35 U.S.C. 154(b) by 861 days.

(21) Appl. No.: 11/667,303

(22) PCT Filed: Nov. 10, 2005

(86) PCT No.: PCT/US2005/040843
§ 371 (c)(1),
(2), (4) Date: May 8, 2007

(87) PCT Pub. No.: WO2006/053171
PCT Pub. Date: May 18, 2006

(65) Prior Publication Data
US 2007/0285351 A1 Dec. 13, 2007

Related U.S. Application Data

(60) Provisional application No. 60/626,764, filed on Nov. 10, 2004.

(51) Int. Cl.
*G09G 3/34* (2006.01)
*G09G 3/20* (2006.01)
(Continued)

(52) U.S. Cl.
CPC .............. *G09G 3/2014* (2013.01); *G09G 3/007* (2013.01); *G09G 3/2022* (2013.01); *H04N 5/21* (2013.01); *G09G 3/28* (2013.01); *G09G 3/346* (2013.01);
(Continued)

(58) Field of Classification Search
CPC . G09G 3/2014; G09G 3/2018; G09G 3/2022; G09G 3/2025; G09G 3/2029
USPC .......................... 345/58, 84, 60–72, 690–694
See application file for complete search history.

(56) References Cited

U.S. PATENT DOCUMENTS

| 5,592,188 A | 1/1997 | Doherty et al. |
| 5,617,484 A * | 4/1997 | Wada ....................... G06K 9/38 382/156 |

(Continued)

FOREIGN PATENT DOCUMENTS

| EP | 1136974 | 9/2001 |
| EP | 0706165 | 11/2001 |

(Continued)

OTHER PUBLICATIONS

Search report dated Mar. 3, 2006.
(Continued)

*Primary Examiner* — Alexander Eisen
*Assistant Examiner* — Nelson Lam
(74) *Attorney, Agent, or Firm* — Robert D Shedd; Vincent E Duffy; James McKenzie

(57) ABSTRACT

In accordance with the present invention, there is provided a system and method for dark noise reduction in pulse width modulated (PWM) displays. The system includes means for determining bright corrected pixel values for dark portions of an image corresponding to a first subframe and means for determining dark corrected pixel values for dark image portions of an image corresponding to a second sub frame of the image frame.

8 Claims, 6 Drawing Sheets

(51) Int. Cl.
  *G09G 3/00* (2006.01)
  *H04N 5/21* (2006.01)
  *G09G 3/28* (2013.01)
  *H04N 5/74* (2006.01)

(52) U.S. Cl.
  CPC .... *G09G 2320/02* (2013.01); *G09G 2320/0238* (2013.01); *G09G 2320/0276* (2013.01); *G09G 2320/066* (2013.01); *H04N 5/7458* (2013.01)

(56) References Cited

U.S. PATENT DOCUMENTS

| | | |
|---|---|---|
| 5,971,546 A | 10/1999 | Park |
| 6,025,818 A * | 2/2000 | Okano ............................. 345/63 |
| 6,226,054 B1 * | 5/2001 | Morgan et al. ................. 348/759 |
| 6,433,763 B1 * | 8/2002 | Lim et al. ........................ 345/68 |
| 6,751,005 B1 | 6/2004 | Barnick et al. |
| 6,961,379 B2 * | 11/2005 | Weitbruch et al. ....... 375/240.16 |
| 7,184,053 B2 | 2/2007 | Correa et al. |
| 2001/0038464 A1 * | 11/2001 | Pettitt et al. ................... 358/426 |
| 2002/0001416 A1 * | 1/2002 | Zhou et al. ..................... 382/268 |
| 2002/0130980 A1 | 9/2002 | Hewlett et al. |
| 2002/0176918 A1 * | 11/2002 | Willcocks et al. ............ 426/512 |
| 2003/0031373 A1 | 2/2003 | Kempf |
| 2003/0084422 A1 | 5/2003 | Chan |
| 2003/0133060 A1 | 7/2003 | Shimada |
| 2003/0231194 A1 * | 12/2003 | Morgan et al. ................ 345/691 |
| 2004/0001184 A1 * | 1/2004 | Gibbons et al. ................. 353/31 |
| 2004/0160459 A1 * | 8/2004 | Fischbeck et al. ............ 345/692 |
| 2004/0227712 A1 * | 11/2004 | Miyasaka et al. .............. 345/89 |
| 2005/0057763 A1 * | 3/2005 | Suzuki ............................ 358/1.9 |
| 2005/0151883 A1 * | 7/2005 | Arai ......................... G09G 3/20 348/572 |
| 2005/0275643 A1 * | 12/2005 | Richards ....................... 345/204 |
| 2006/0018537 A1 * | 1/2006 | Wu et al. ........................ 382/168 |
| 2007/0035706 A1 * | 2/2007 | Margulis ...................... 353/122 |
| 2007/0237418 A1 * | 10/2007 | Toyoda ................... G06T 5/008 382/260 |
| 2008/0024518 A1 * | 1/2008 | Hoffman et al. ............... 345/611 |
| 2008/0158268 A1 * | 7/2008 | Hui ................................ 345/691 |
| 2010/0209015 A1 * | 8/2010 | Yu ........................... G06T 5/009 382/270 |
| 2011/0141371 A1 * | 6/2011 | Lo ............................. H04N 5/57 348/673 |
| 2012/0075498 A1 * | 3/2012 | Watanabe ............ H04N 1/6027 348/222.1 |

FOREIGN PATENT DOCUMENTS

| | | |
|---|---|---|
| EP | 1391867 | 2/2004 |
| EP | 0704835 | 9/2005 |
| JP | 10078550 | 3/1998 |
| JP | 2000206923 | 7/2000 |
| JP | 2001117528 | 4/2001 |
| JP | 2002135608 | 5/2002 |
| JP | 2003528517 | 9/2003 |
| JP | 2003345288 | 12/2003 |
| JP | 2003345299 | 12/2003 |
| JP | 2004138783 | 5/2004 |
| JP | 2003153000 | 5/2005 |
| WO | WO2004/068461 | 8/2004 |

OTHER PUBLICATIONS

Japanese Office Action dated Mar. 5, 2013.

* cited by examiner

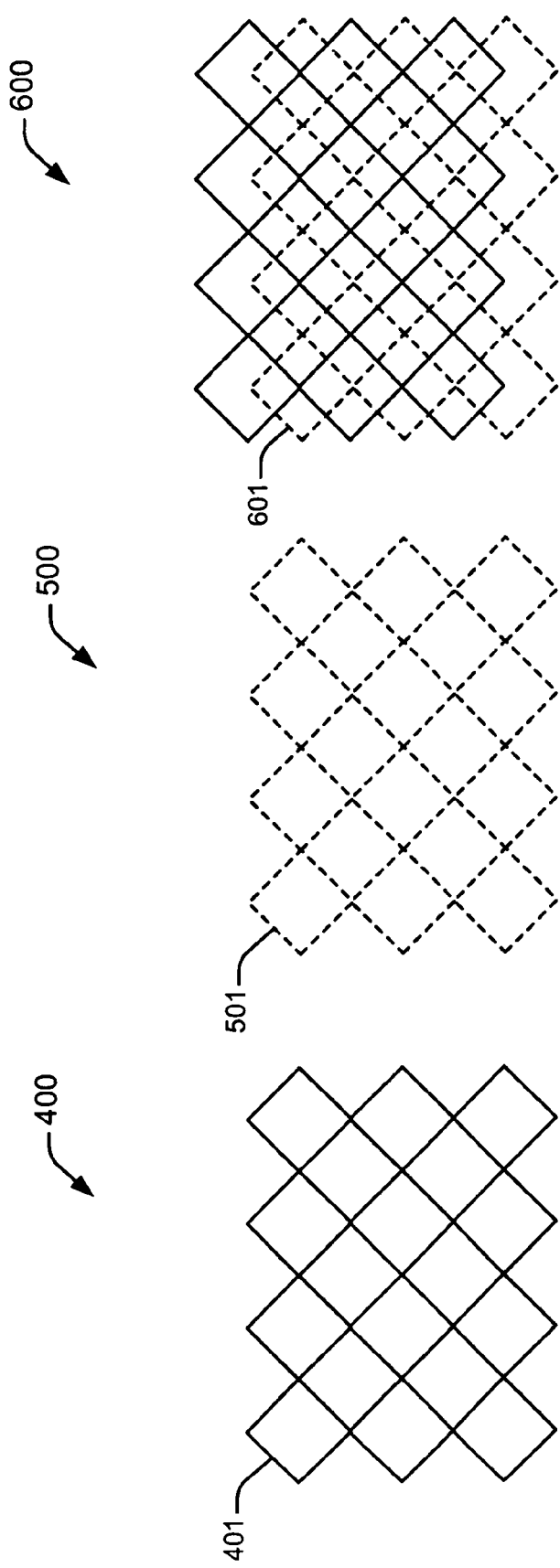

SYSTEM AND METHOD FOR DARK NOISE REDUCTION IN PULSE WIDTH MODULATED (PWM) DISPLAYS

RELATED APPLICATIONS

This application claims the benefit, under 35 U.S.C. §365 of International Application PCT/US2005/040843 filed Nov. 10, 2005 which was published in accordance with PCT Article 21(2) on May 18, 2006 in English and which claims the benefit of U.S. provisional patent application No. 60/626, 764 filed Nov. 10, 2004.

FIELD OF THE INVENTION

The present invention relates to a system and method for processing digital video image data, and more particularly, to a system and method for processing video data in a spatial light modulated (SLM) display wherein perceptible noise in low brightness portions of a displayed video image is reduced.

BACKGROUND OF THE INVENTION

Plasma and DLP displays are examples of Pulse Width Modulated (PWM) display types. PWM displays have only digital ON and OFF pixel states. Accordingly, PWM displays provide an image by integrating light emitted in respective sub-field periods. If the switching frequency is high enough, the eye responds to the time-averaged brightness of the pixel. Only a discrete set of intensity levels can be produced. As a result, the intensity scale is no longer smooth but rather increases as a series of steps. The intensity steps apply individually to each of the red, green, and blue primary color channels. The steps introduce quantization errors into hue and saturation for all resulting color mixtures. The greater the number of digital levels, the smaller the error. If the steps are very fine, the eye will not notice the jumps and lack of smoothness. If the steps are not very fine, the granularity of the digital steps will introduce false visual intensity and contours into a displayed image. These effects are most noticeable in fine graduations of either intensity or color within an image. In addition, at low brightness levels, i.e., low intensities, the "on" pixel state time is so brief that it may be visually perceived as image noise. Such noise is referred to herein as dark noise.

SUMMARY OF THE INVENTION

In accordance with the present invention, there is provided a system and method for dark noise reduction in pulse width modulated (PWM) displays. The system includes means for determining bright corrected pixel values for dark portions of an image corresponding to a first sub frame and means for determining dark corrected pixel values for dark image portions of an image corresponding to a second sub frame of the image frame.

BRIEF DESCRIPTION OF THE DRAWINGS

A complete understanding of the present invention may be obtained by reference to the accompanying drawings, when considered in conjunction with the subsequent, detailed description, in which:

FIG. 4 is a pictorial view of pixels comprising a first sub frame of a frame of a video image according to a pixel shift embodiment of the present invention;

FIG. 5 is a pictorial view of pixels comprising a second sub frame of a frame of frame a video image according to a pixel shift embodiment of the present invention;

FIG. 6 is a pictorial view of a frame of a video image comprising the first and second sub frames illustrated in FIGS. 4 and 5 according to a pixel shift embodiment of the invention;

DETAILED DESCRIPTION OF THE DRAWINGS

Figure 1:
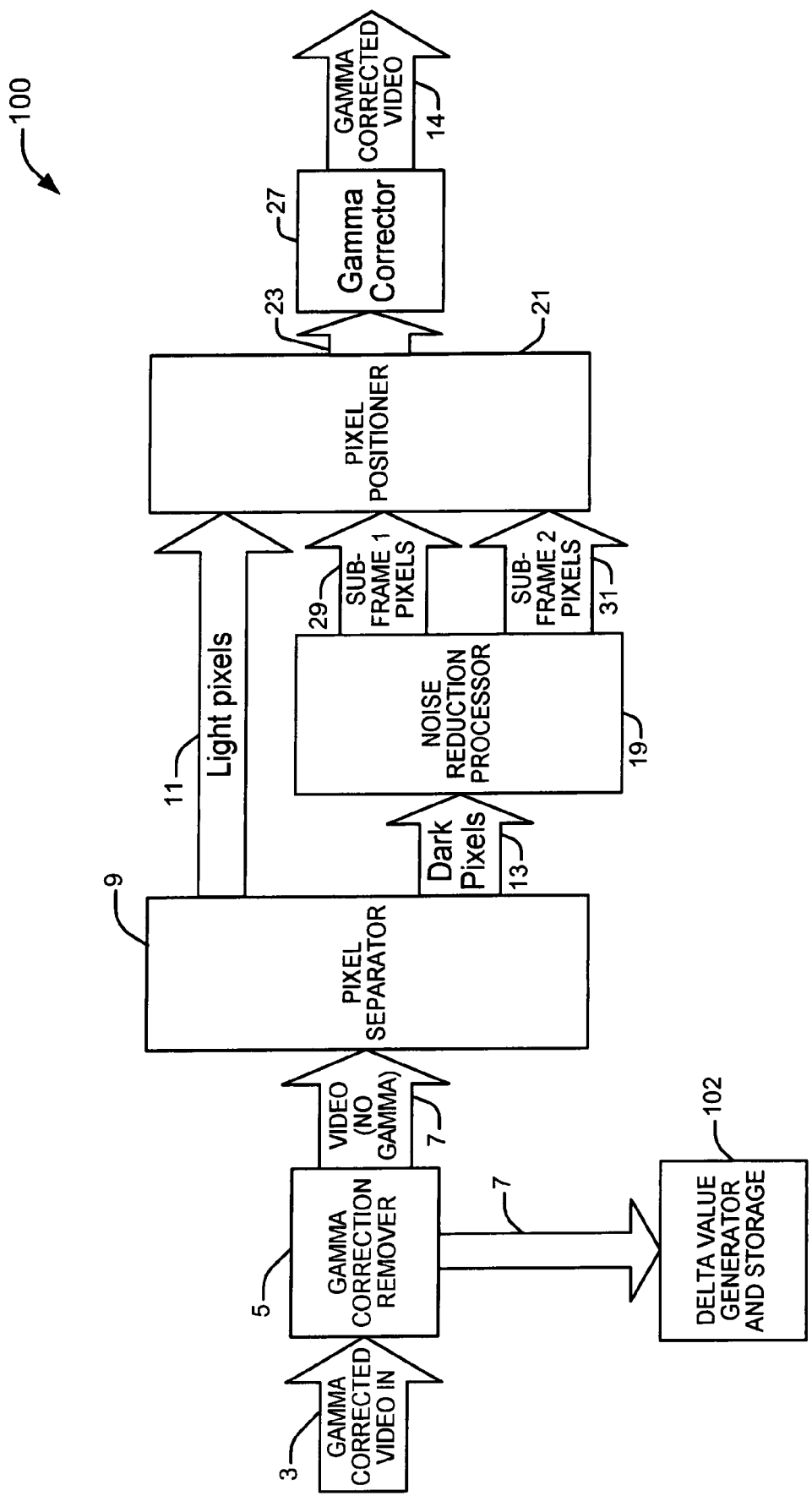
FIG. 1 is a block diagram view of a dark noise removal circuit according to an embodiment of the invention.

A so called "pixel-shift" technique is employed in some PWM displays in order to enhance the resolution of the projected images. According to this technique the pixels of the image frame are temporally divided into at least two sub frames. This concept is illustrated pictorially in FIGS. 4, 5 and 6. FIG. 4 illustrates a first sub frame 400, comprising pixels 401 (one representative pixel shown) of a frame 600 of a video image to be displayed. FIG. 5 illustrates a second sub frame 500 comprising pixels 501 (one representative pixel shown) of the frame 600 of the video image to be displayed. FIG. 6 illustrates the frame 600 comprising pixels 401 of sub frame 400 and pixels 501 of sub frame 500. Frame 600 represents the entire video image to be displayed by frame 600. Some embodiments of the present invention include at least two sub frames for each color image frame to be displayed. However, alternative embodiments of the invention include four sub frame images for each color image frame to be displayed. Other embodiments of the invention are envisioned comprising more than four sub frame images to represent a frame to be displayed. The sub images are projected onto a display surface spatially and temporally displaced relative to the other sub images of the image frame.

The term "display system" is used herein and in the appended claims, unless otherwise specifically denoted, to refer to a projector, projection system, image display system, television system, video monitor, computer monitor system, or any other system configured to create a sequence of image frames. The sequence of image frames produces an image that may be a still image, a series of images, or motion picture video. The phrase "sequence of image frames", "successive image frames" and the term "image" are used herein and in the appended claims, unless otherwise specifically denoted, to refer broadly to a still image, series of images, motion picture video, or anything else that is displayed by a display system.

FIG. 1 illustrates a dark noise reduction system 100 for use in pulse width modulated (PWM) displays. The dark noise reduction system 100 receives successive frames of gamma corrected video 3 at an input. The gamma corrected video 3 is coupled to a gamma correction remover 5. Gamma correction remover 5 removes any gamma correction from the input video data 3 to provide video data 7 at an output that is free of gamma correction. One output for video data 7 of gamma correction remover 5 is coupled to a dark pixel separator 9. Another output for video data 7 of gamma correction remover 5 is coupled to a delta value generator 102. Delta value generator 102 generates and stores frames of delta values corresponding to successive frames of video data 7.

Delta value generator 102 receives frames of image data 7 and calculates corresponding frames of delta values. Delta value generator operates by examining each successive horizontal pixel pair, (Pn and Pn+1) in a frame. Delta value benerator 102 forms delta values for each frame by taking the difference between adjacent horizontal pixels in the frame. For example for a pair of horizontal adjacent pixels 1 and 2, delta_1, 2 is selected to be the minimum value of =(p1, p2, 1−p1, 1−p2), wherein p1 is the pixel value of pixel 1, and p2 is the pixel value of pixel 2. A delta value is thus computed for each horizontal pixel pair in a frame. In one embodiment of the invention, a memory (not shown) of delta value generator 102 stores at least one frame of delta values for a frame of image data 7. The delta values are used by first sub frame processor 17 and second sub frame processor 190 of dark noise reduction processor 19 to calculate modified pixel values for noise reduction in dark image portion pixels 13 of the frames of image data 7.

Gamma correction remover 5 provides successive frames of image data 7 (without gamma correction) to a pixel separator 9. The frames of image data 7 provided to pixel separator 9 can include light image portion pixels 11 and dark image portion pixels 13. The pixel separator 9 separates the light image portion pixels 11 from the dark image portion pixels 13.

Pixel separator 9 does this by evaluating successive frames of image data 7. Pixels within a frame having a value equal to, or greater than 1 (of 256), are selected to represent light image portion pixels 11. Light image portion pixels 11 are provided by pixel separator 9 to pixel positioner 21. Pixels within a frame having a value less than 1 are selected to represent dark image portion pixels 13. Pixel separator 9 is coupled to a noise reduction processor 19 and to pixel positioner 21. Dark image portion pixels 13 are provided by pixel separator 9 to noise reduction processor 19. The light image portion pixels 11 are provided by dark pixel separator 9 to pixel positioner 21.

Figure 3:
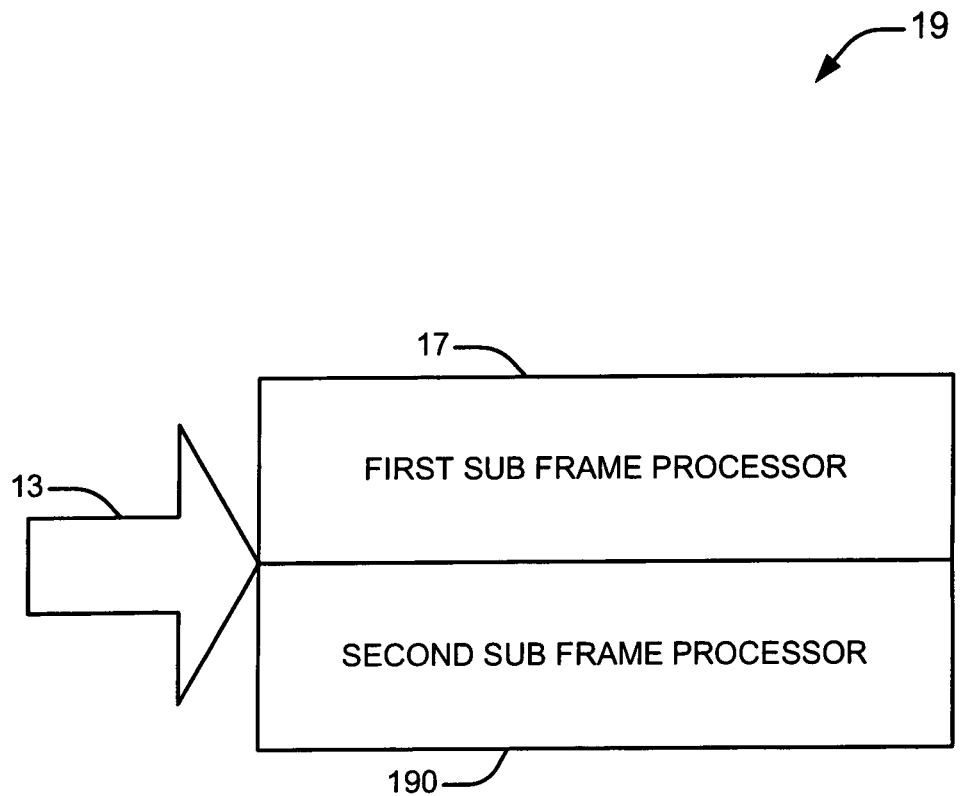
FIG. 3 is a block diagram view of a dark noise processor according to an embodiment of the invention.

FIG. 3 illustrates a noise reduction processor 19 according to an embodiment of the invention. The dark image portion pixels 13 are provided to a dark noise reduction processor 19 at an input. Dark noise reduction processor 19 includes a first sub frame processor 17. First sub frame processor 17 receives dark image portion pixels 13 corresponding to a first sub image of a frame. First sub frame processor 17 processes the dark image portion pixels 13 and provides a sub frame comprising bright corrected pixel values $Pb\_n$.

Dark noise reduction processor 19 further includes a second sub frame processor 190. Second sub frame processor 190 receives dark image portion pixels 13 to be included in a second sub frame of the frame. Second sub frame processor 190 processes the dark image pixels 13 corresponding to the second sub frame and provides dark corrected pixel values $Pd\_n$ for inclusion in the second sub frame.

First sub frame processor 17 determines bright corrected pixel values $Pb\_n$ in accordance with the relationship $Pb\_n = Pn + 5*(delta\_n, n-1 + delta\_n, n+1)$, where $Pb\_n$ is the corrected value for a pixel n of pixel value Pn in a first sub frame, and wherein $delta\_n, n-1$ is the delta value corresponding to the difference between the value of pixel n in the first sub frame (See, for example, FIG. 4) and pixel n−1 in the second sub frame (See for example, FIG. 5). Pixel n−1 is a pixel horizontally adjacent to pixel n in one direction in a frame of pixels comprising both sub frames (See, for example, FIG. 4), wherein pixel n+1 is a pixel horizontally adjacent to pixel n in the second sub frame the other direction.

Second sub frame processor 190 determines dark corrected pixel values $Pd\_n$ in accordance with the relationship $Pd\_n = Pn - 0.5*(delta\_n, n-1 + delta\_n, n+1)$; wherein $Pd\_n$ is the corrected value for a pixel n of value Pn in the second sub frame, and wherein $delta\_n, n-1$ is the delta between the value of pixel n in the second sub frame and pixel n−1 in the first sub frame, wherein pixel n−1 is a pixel horizontally adjacent to pixel n in one direction and pixel n+1 is a pixel horizontally adjacent to pixel in the other direction.

According to one example embodiment of the invention, if all the pixels are equal, then the deltas of all pixel pairs are equal. If the equal pixels are, for example, below 0.5 linear, then the dark sub image pixels will be zero and the bright sub image pixels will be doubled. On the other hand, if the equal pixels are, for example, above 0.5 linear, then the bright sub image pixels will equal 1 and the dark sub image pixels will be below 1 such that the average of the two equals the original pixel values. If a flat image area is present, one of the sub images will have no noise. The other sub image will have noise which is at least below one original sub image noise doubled. The result is reduced noise in the displayed image.

First sub frame processor 17 provides bright corrected pixel values comprising first sub frame pixels 29 to pixel positioner 21 and second sub frame processor 190 provides dark corrected second sub frame pixels 31 to pixel positioner 21. It will be apparent to those of ordinary skill in the art that the choice of first and second sub frames for light and dark correction processing is arbitrary. According to various embodiments, either the first or second sub frames can process pixels to provide corrected sub frames with either light or dark correction.

Pixel positioner 21 restores the light image portion pixels 11, the light corrected first sub frame pixels 29 and the dark corrected second sub frame pixels 31 to their corresponding respective pixel positions within successive respective first and second sub frames of video frames. The video frames comprising light corrected first sub frame pixels 29 and dark corrected second sub frame pixels 31 comprise dark noise corrected video frames corresponding to video frames of image data 7.

The pixel positioner 21 provides successive frames of dark noise corrected pixel data 23, which is not corrected for gamma, to a gamma corrector 27. Gamma corrector 27 restores the gamma correction removed by the gamma correction remover 5. Gamma corrector 27 provides an output video signal 14 that is dark noise corrected and gamma corrected.

According to an alternative embodiment of the invention, two successive frames of input video, instead of two sub images, are processed in accordance with the principles described above. This embodiment generates two different types of frames from an input pair of successive frames. One type of frame is darker than the original and the other type of frame is brighter than the original. Regardless of whether the invention is applied to successive sub images of a frame, or to successive frames, the initial processing is the same as the processing employed for successive sub images. However, for two successive frames, a brighter type frame is calculated as follows: $Pbr = minimum(2*Pnr, 1)$ where Pbr is a noise-reduced pixel of the brighter frame and Pnr is a pixel from the original frame after the intra-frame noise reduction.

A darker type frame is calculated as follows: $Pdr = 2*Pnr - Pbr$ where Pdr is a noise reduced pixel of the darker frame and Pnr, Pbr are as above. According to some embodiments of the invention the above calculations are performed only on the portion of the pixel values below linear 1, that is the dark pixels as determined by pixel separator 9.

Figure 2:
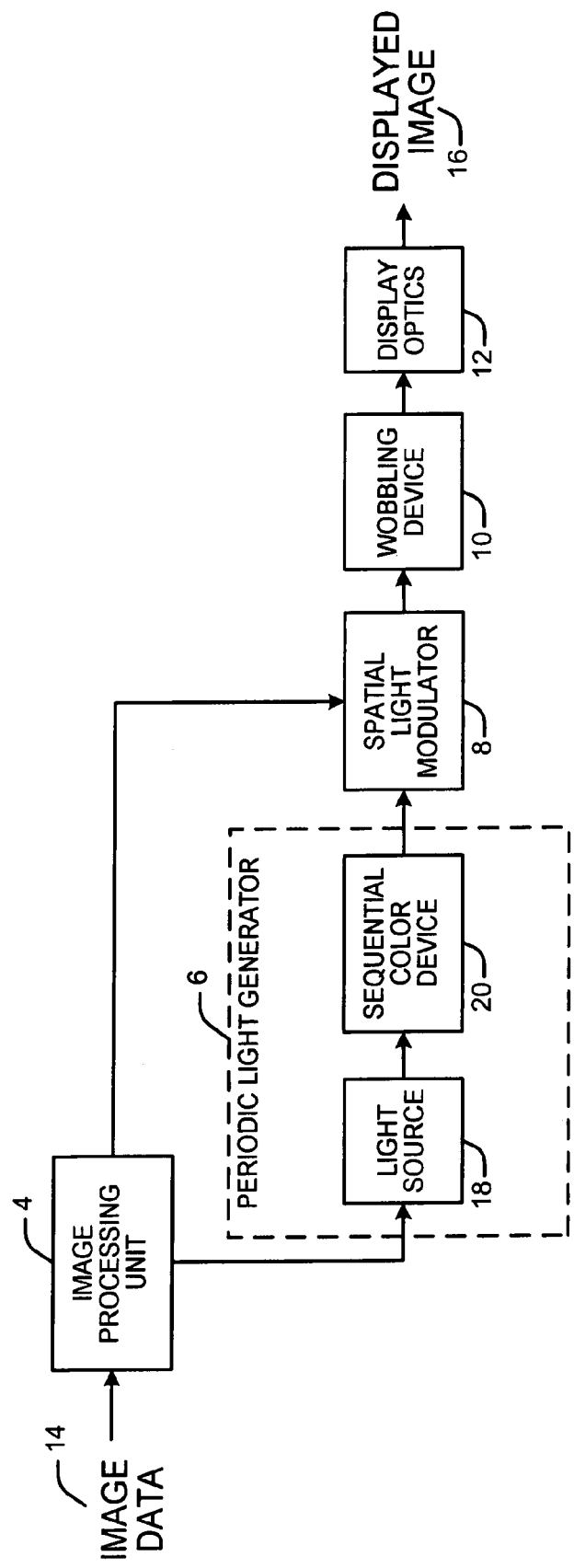
FIG. 2 is a block diagram view of an example pulse width modulation (PWM) display system suitable for use in conjunction with a dark noise reduction circuit of the type illustrated in FIG. 1 according to various embodiments of the invention.

FIG. 2 illustrates an example of a pulse width modulation (PWM) display system 192 of a type suitable for employing the dark noise reduction system 100 of the type illustrated in FIG. 1 to produce color image frames by generating a plurality of colors of light in sequence, spatially modulating the colors of light and projecting the spatially modulated colors of light to form the image frames. The colors of light are typically derived from a white light source passed through a color filter wheel, prism, or some other color filter.

In the embodiment illustrated in FIG. 2, display system 2 includes image processing unit 4, light generator 6, spatial light modulator (SLM) 8, wobbling device 10, and display optics 12. Display system 2 receives image data 14. Image data 14 defines image 16 to be displayed and display system 2 uses image data 14 to produce displayed image 16. Examples of image data 14 include digital image data, analog image data, and a combination of analog and digital data as for example provided by the dark noise reduction system 100 illustrated in FIG. 1.

While one image 16 is illustrated and described as being processed by display system 2, it will be understood by one skilled in the art that a plurality or series of images 16, or motion picture video display 16, may be processed by display system 2.

Light generator 6 is any apparatus or system configured to generate a plurality of colors of light having a color sequence that periodically varies with a characteristic sequential color time period. Periodic light generator 6 is disposed within display device 2 to pass the plurality of colors of light across SLM 8. A wobbling device 10 shifts the pixels from SLM 8 so as to provide a displayed image comprising first and second sub frames temporally and spatially displaced from one another on a display surface (not shown).

FIG. 4 is a pictorial diagram illustrating example pixels 401 comprising a first sub frame 400 of a frame 600 (FIG. 6) of a video image according to a pixel shift embodiment of the present invention.

FIG. 5 is a pictorial diagram illustrating example pixels 501 comprising a second sub frame 500 of a frame of a video image 600 (FIG. 6) according to a pixel shift embodiment of the present invention.

FIG. 6 is a pictorial diagram illustrating a frame 600 of a video image comprising the example first and second sub frames 400 and 500 illustrated in FIGS. 4 and 5 according to a pixel shift embodiment of the invention.

Figure 7A:
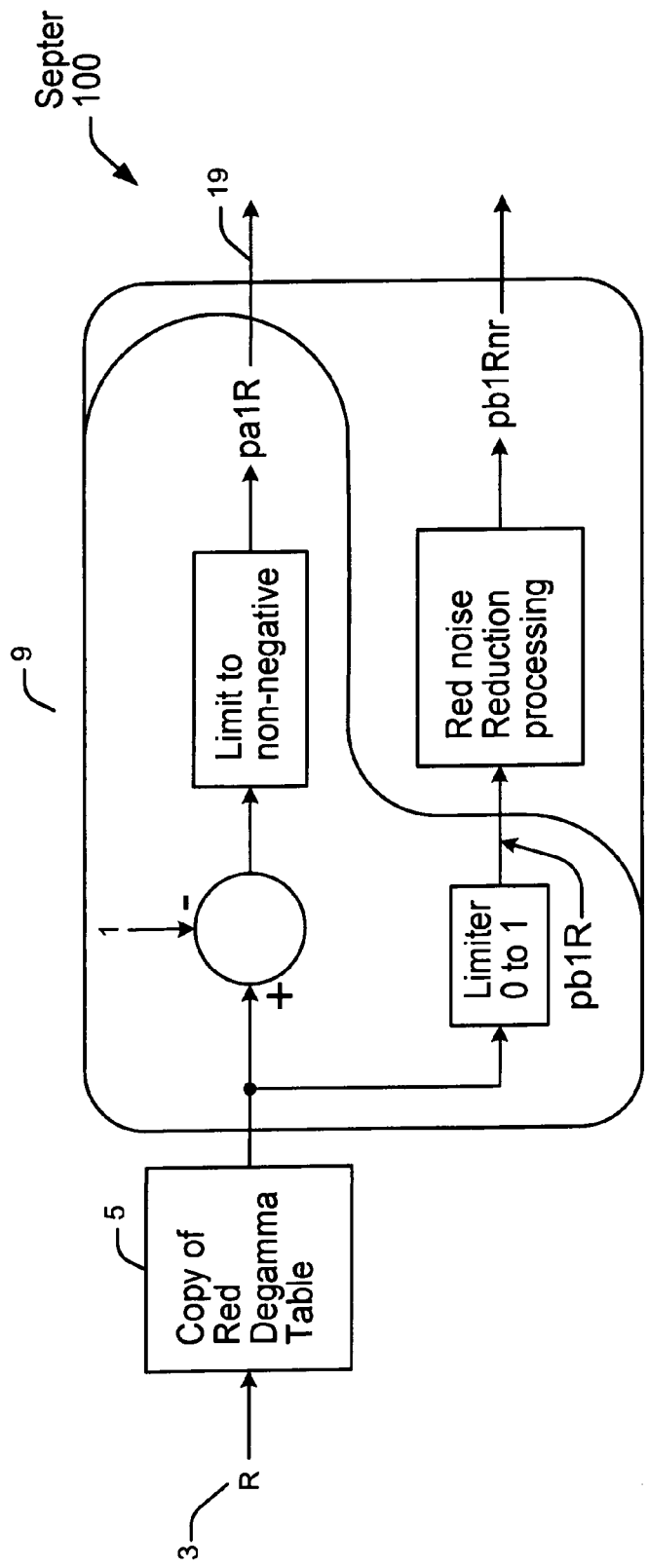
FIGS. 7A and 7B are block diagram representations of an alternative embodiment of the invention employing a subsystem external to a light engine of a PWM display system.
Figure 7B:
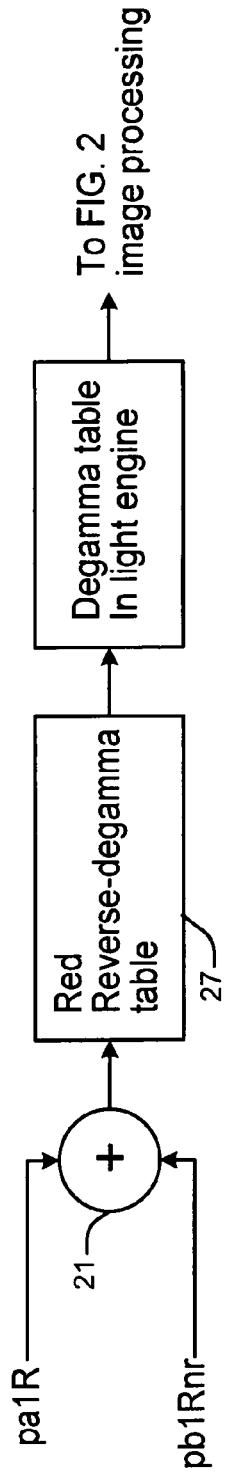

FIG. 7 illustrates a noise correction circuit according to an embodiment of the invention wherein like numerals indicate corresponding functional blocks in FIG. 1 having corresponding numerals.

Figure 8:
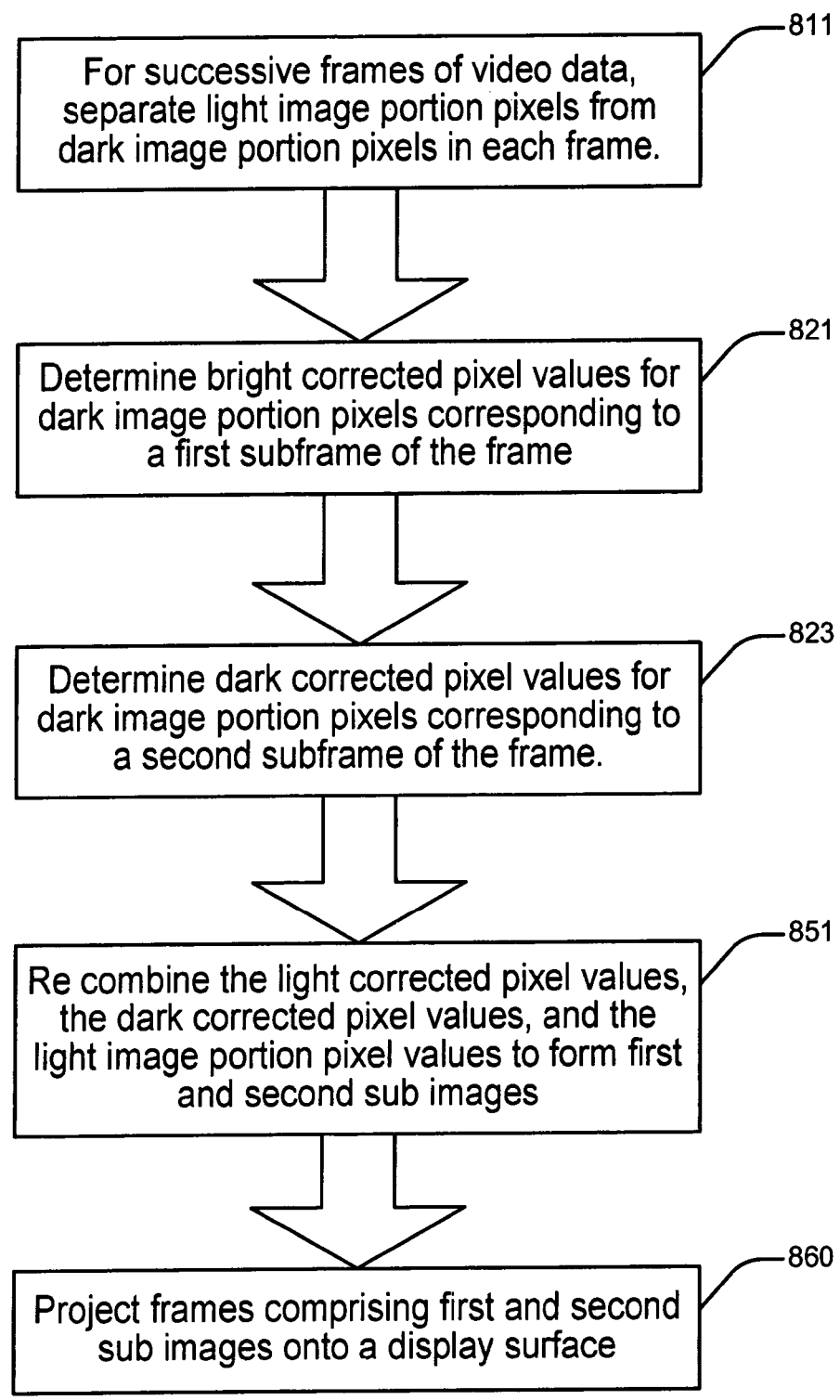
FIG. 8 is a flow chart illustrating steps of a method for correcting dark noise according to an embodiment of the invention.

FIG. 8 is a flow chart illustrating a method for correcting dark noise according to an embodiment of the invention. According to a method of the invention, a first step 811 comprises, for successive frames of video data, separating light image portion pixels from dark image portion pixels in each frame. A second step 821 comprises determining bright corrected pixel values for dark image portion pixels corresponding to a first sub frame of the frame. A further step 823 comprises determining dark corrected pixel values for dark image portion pixels corresponding to a second sub frame of the frame. A further step 851 comprises re-combining the light corrected pixel values, the dark corrected pixel values and the light image portion pixel values to form first and second sub images for the frame. A further step 860 comprises projecting the frame comprising the first and second sub images onto a display surface.

According to some embodiments of the invention a step of removing gamma correction from successive gamma corrected frames of video is carried out before step 811. According to an embodiment of the invention, steps 821 and 823 are carried out, at least in part, by a step of generating frames of delta values corresponding to frames of video to be corrected for dark noise. According to an embodiment of the invention, this step of generating delta values is carried out by examining each successive horizontal pixel pair, (Pn and Pn+1) in a frame of incoming video (with any gamma correction removed) as follows: delta_1, 2=minimum(p1, p2, 1−p1, 1−p2). One embodiment of the invention includes a step of storing in a memory a frame of delta values for at least one frame of image data 7.

In one embodiment of the invention the next step 811 of separating pixels of image data 7 into light image portions comprising pixels in light image portions of a frame and dark image portions comprising pixels from dark image portions of the frame is carried out, at least in part, by a step of operating on successive frames of image data 7 such that pixels within said frames having a value equal to, or greater than, 1 (of 256) are selected as bright pixels comprising bright image portion pixels 11, and operating on successive frames of image data 7 such that pixels within said frames having a value less than 1 are selected as dark pixels comprising dark image portion pixels 13.

The step 851 is carried out by combining sub frame 1 pixels corrected for noise reduction with sub frame 2 pixels corrected for noise reduction and with light pixels. The combining step provides successive frames of pixels wherein the frames have reduced dark noise in the displayed image. The reduced dark noise frames are then displayed in step 860 on a display device such as that illustrated in FIG. 2.

For successive first and second sub frames of successive corresponding frames of image data 7, bright corrected pixel values Pb_n are determined in step 821 in accordance with the relationship Pb_n=Pn+5*(delta_n, n−1+delta_n, n+1), where Pb_n is the corrected value for a pixel n of pixel value Pn in a first subframe, and wherein delta_n, n−1 is the delta value corresponding to the difference between the value of pixel n in the first sub frame (See, for example, FIG. 4) and pixel n−1 in the second sub frame (See for example, FIG. 5). Pixel n−1 is a pixel horizontally adjacent to pixel n in one direction in a frame of pixels comprising both sub frames (See, for example, FIG. 4), wherein pixel n+1 is a pixel horizontally adjacent to pixel n in the second sub frame the other direction.

The step 823 of determining dark corrected pixel values Pd_n in accordance with an embodiment of the invention is carried out by determining Pd_n=Pn−0.5*(delta_n, n−1+ delta_n, n+1); wherein Pd_n is the corrected value for a pixel n of value Pn in the second sub frame, and wherein delta_n, n−1 is the delta between the value of pixel n in the second sub frame and pixel n−1 in the first sub frame, wherein pixel n−1 is a pixel horizontally adjacent to pixel n in one direction and pixel n+1 is a pixel horizontally adjacent to pixel in the other direction.

It is to be understood that the present invention may be implemented in various forms of hardware, software, firmware, special purpose processors, or a combination thereof. Preferably, the present invention is implemented as a combination of hardware and software.

In various embodiments, processors are implemented on a computer platform having hardware such as one or more central processing units (CPU), a random access memory (RAM), and input output (I/O) interface(s). The computer platform also includes an operating system and microinstruction code to carry out the steps of the method according to the various embodiments of the invention.

Alternatively, portions of the present invention may be implemented in hardware circuits within an application specific integrated circuit (ASIC) or a programmable logic device (PLD) such as a field programmable gate array (FPGA).

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for dark noise reduction in pulse width modulated (PWM) displays, comprising steps of:
   measuring brightness level differences between adjacent pixels in successive frames of video data;
   establishing a pixel brightness level threshold;
   defining said pixels in said successive frames of video data as bright image pixels or dark image pixels with respect to said brightness level threshold;
   for said successive frames of video data, separating said bright image pixels from said dark image pixels;
   generating from said dark image pixels first and second sets of corrected pixels having brightness levels corrected in accordance with said brightness level differences between adjacent pixels in successive frames of video data;
   combining said first set of corrected pixels, said second set of corrected pixels and said bright image pixels to form successive frames of corrected video data; and,
   displaying video images responsive to said successive frames of corrected video data.

2. The method of claim 1, comprising the step of using a value of 1 for said pixel brightness level threshold.

3. The method of claim 1, wherein said generating step comprises the steps of:
   generating said first set of corrected pixels from a first sub-frame of said dark image pixels; and,
   generating said second set of corrected pixels from a second sub-frame of said dark image pixels.

4. The method of claim 1, wherein said brightness level difference measuring step comprises the step of selecting the smallest pixel brightness value among a set of values including at least:
   the brightness value of a first one of adjacent pixels;
   the brightness value of a second one of adjacent pixels;
   a difference between said threshold value and said brightness value of said first one of adjacent pixels; and,
   a difference between said threshold value and said brightness value of said second one of adjacent pixels.

5. An apparatus for dark noise reduction, the apparatus comprising:
   a delta value generator and storage configured to measure brightness level differences between adjacent pixels in successive frames of video data;
   a pixel separator configured to establish a pixel brightness level threshold, define said pixels in said successive frames of video data as bright image pixels or dark image pixels with respect to said brightness level threshold, and for said successive frames of video data, separate said bright image pixels from said dark image pixels;
   a noise reduction processor configured to generate from said dark image pixels first and second sets of corrected pixels having brightness levels corrected in accordance with said brightness level differences between adjacent pixels in successive frames of video data;
   a pixel positioner configured to combine said first set of corrected pixels, said second set of corrected pixels and said bright image pixels to form successive frames of corrected video data; and
   a display configured to display video images responsive to said successive frames of corrected video data.

6. The apparatus of claim 5, wherein the pixel separator uses a value of 1 for said pixel brightness level threshold.

7. The apparatus of claim 5, wherein said noise reduction processor comprises:
   a first sub frame processor configured to generate said first set of corrected pixels from a first sub-frame of said dark image pixels; and
   a second sub frame processor configured to generate said second set of corrected pixels from a second sub-frame of said dark image pixels.

8. The apparatus of claim 5, wherein said delta value generator and storage is further configured to select the smallest pixel brightness value among a set of values including at least:
   the brightness value of a first one of adjacent pixels;
   the brightness value of a second one of adjacent pixels;
   a difference between said threshold value and said brightness value of said first one of adjacent pixels; and,
   a difference between said threshold value and said brightness value of said second one of adjacent pixels.

* * * * *